United States Patent
Hyodo et al.

(10) Patent No.: US 11,119,351 B2
(45) Date of Patent: Sep. 14, 2021

(54) DISPLAY DEVICE

(71) Applicant: Japan Display Inc., Tokyo (JP)

(72) Inventors: Yosuke Hyodo, Tokyo (JP); Toshiyuki Higano, Tokyo (JP); Yoshiro Aoki, Tokyo (JP); Shinichiro Oka, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/148,637

(22) Filed: Jan. 14, 2021

(65) Prior Publication Data

US 2021/0132434 A1 May 6, 2021

Related U.S. Application Data

(63) Continuation of application No. PCT/JP2019/027267, filed on Jul. 10, 2019.

(30) Foreign Application Priority Data

Aug. 13, 2018 (JP) .............................. JP2018-152163

(51) Int. Cl.
*G02F 1/1335* (2006.01)
*G02F 1/1333* (2006.01)
(Continued)

(52) U.S. Cl.
CPC ...... *G02F 1/133512* (2013.01); *G02F 1/1339* (2013.01); *G02F 1/133305* (2013.01); *G02F 1/133345* (2013.01); *G02F 1/13685* (2021.01)

(58) Field of Classification Search
CPC ............................................... G02F 1/133512
See application file for complete search history.

(56) References Cited

U.S. PATENT DOCUMENTS

2016/0087022 A1 3/2016 Tsai et al.
2017/0059918 A1 3/2017 Sasaki et al.
(Continued)

FOREIGN PATENT DOCUMENTS

JP 2011-209405 A 10/2011
JP 2017-44714 A 3/2017
(Continued)

OTHER PUBLICATIONS

International Search Report dated Aug. 13, 2019 in PCT/JP2019/027267 filed Jul. 10, 2019, 2 pages.

*Primary Examiner* — Edmond C Lau
(74) *Attorney, Agent, or Firm* — Oblon, McClelland, Maier & Neustadt, L.L.P.

(57) ABSTRACT

The display device includes: a first substrate; a second substrate; and a liquid crystal layer placed between the first substrate and the second substrate. The first substrate and the second substrate have a display area and a frame area around the display area. The frame area has a seal material placed between the first substrate and the second substrate. The second substrate has: a second resin substrate; in the display area, a first multilayer layer placed on a side of the second resin substrate facing the liquid crystal layer, the first multilayer layer including a first inorganic insulating film, a light shielding member, and an overcoat film; and in the frame area, a second multilayer layer placed on the side of the second resin substrate facing the liquid crystal layer, the second multilayer layer including the light shielding member and the overcoat film.

9 Claims, 9 Drawing Sheets

(51) Int. Cl.
*G02F 1/1339* (2006.01)
*G02F 1/1368* (2006.01)

(56) References Cited

U.S. PATENT DOCUMENTS

2017/0220163 A1* 8/2017 Kurasawa ........... G06F 3/04166
2018/0059840 A1 3/2018 Hirosawa

FOREIGN PATENT DOCUMENTS

JP 2017-536646 A 12/2017
JP 2018-31977 A 3/2018

* cited by examiner

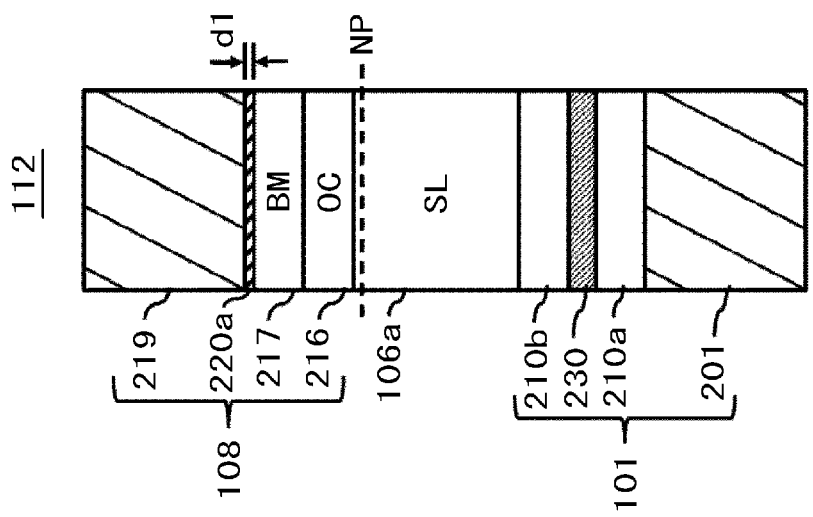
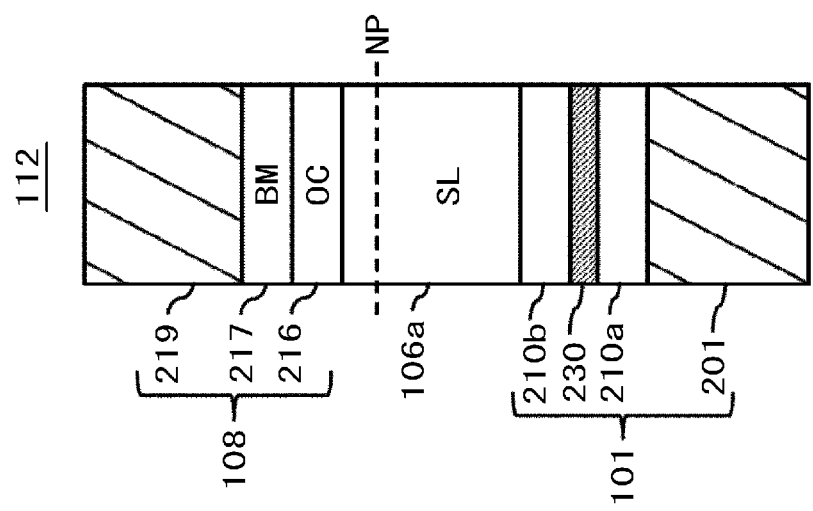
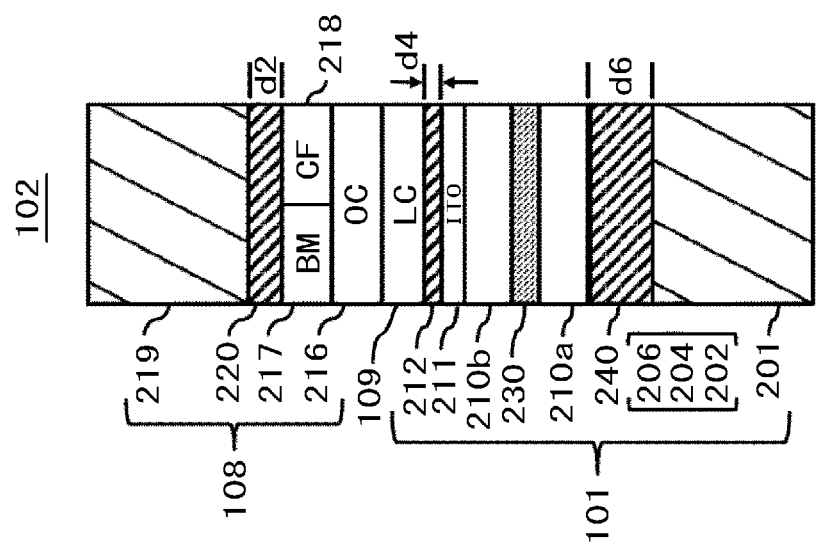

DISPLAY DEVICE

CROSS-REFERENCE TO RELATED APPLICATION

This application is a Bypass Continuation Application of PCT international Application No. PCT/JP2019/027267 filed on Jul. 10, 2019, which claims priority to Japanese Patent Application No. 2018-152163, filed on Aug. 13, 2018, the entire contents of which are incorporated herein by reference.

BACKGROUND OF THE INVENTION

The present invention relates to display devices and, more particularly, is applicable to display devices with flexibility.

As the display devices, a liquid crystal display device using a substrate having flexibility and formed of resin material such as polyimide (PT) and/or the like is disclosed by Japanese Unexamined Patent Application Publication No. 2017-44714, for example.

A display device with flexibility includes: an array substrate having pixel electrodes, thin-film transistor circuit elements, and the like formed on a resin substrate such as a PI film and/or the like; a counter substrate having color filters and the like formed on a resin substrate such as a PI film and/or the like; a liquid crystal layer disposed between the array substrate and the counter substrate; and a seal material used to seal the liquid crystal layer between the array substrate and the counter substrate.

The display device with flexibility is capable of being bent at an end portion of the liquid crystal panel. Bending the end portion of the liquid crystal panel allows a frame area located on the outer perimeter of the display area to move to a location on a lateral side or a backside of the display device. This provides the display panel with a narrow frame or without the frame. However, when the end portion of the liquid crystal pane is bent, wiring placed in the bent liquid crystal panel area may sometimes have a break.

SUMMARY OF THE INVENTION

It is an object of the present invention to provide a display device capable of preventing a break in wiring even when an end portion of a liquid crystal panel is bent.

These and other challenges and novel features will be apparent from the following description of the specification and the associated drawings.

An overview of representative embodiments according to the present invention will be briefly described below.

Specifically, a display device includes: a first substrate; a second substrate; and a liquid crystal layer placed between the first substrate and the second substrate. The first substrate and the second substrate have a display area and a frame area around the display area. The frame area has a seal material placed between the first substrate and the second substrate. The second substrate has: a second resin substrate; in the display area, a first multilayer layer placed on a side of the second resin substrate facing the liquid crystal layer, the first multilayer layer including a first inorganic insulating film, a light shielding member, and an overcoat film; and in the frame area, a second multilayer layer placed on the side of the second resin substrate facing the liquid crystal layer, the second multilayer layer including the light shielding member and the overcoat film.

BRIEF DESCRIPTION OF THE DRAWINGS

FIGS. 4A to 4C are cross-sectional views illustrating schematic configurations of a display portion and a bend portion of a display panel according to the embodiments, of which FIG. 4A is the cross-sectional view illustrating the schematic configuration of the display portion, FIG. 4B is the cross-sectional view illustrating the schematical configuration of the bend portion, and FIG. 4C is the cross-sectional view illustrating the configuration according to a first modification of the bend portion in outline;

FIGS. 7A to 7C are cross-sectional views illustrating schematic configurations of bend portions according to a second modification to a fourth modification, of which FIG. 7A is the cross-sectional view illustrating the schematic configuration of the bend portion according to the second modification, FIG. 7B is the cross-sectional view illustrating the schematic configuration of the bend portion according to a third modification, and FIG. 7C is the cross-sectional view illustrating the schematic configuration of the bend portion according to the fourth modification;

DETAILED DESCRIPTION OF THE PREFERRED EMBODIMENTS

To begin with, a task will be described using the accompanying drawings.

Figure 8:
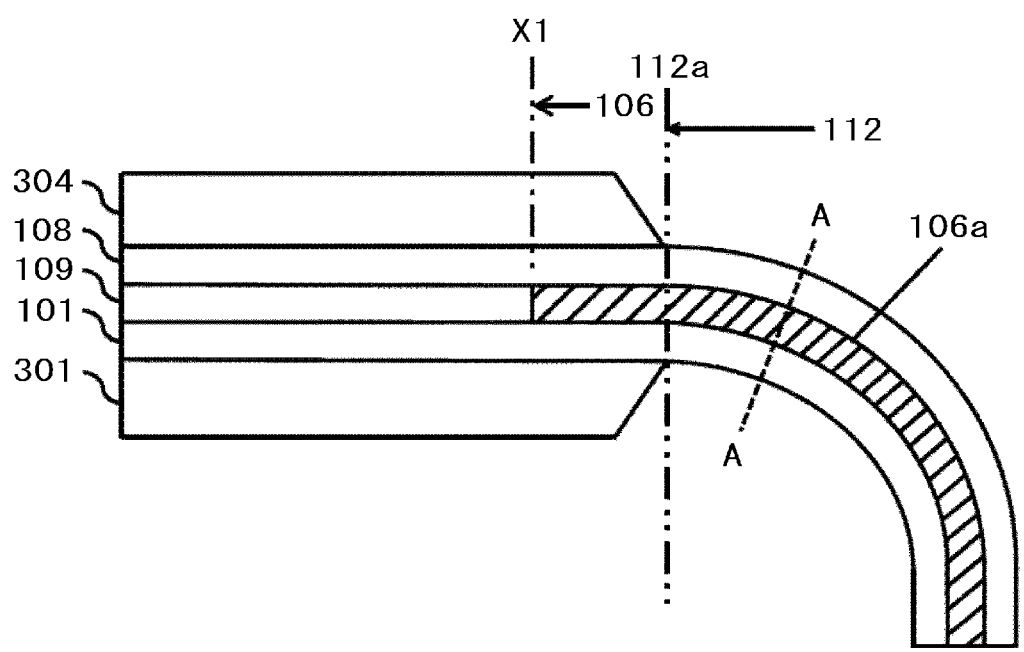
FIG. 8 is a cross sectional view illustrating an example of a schematic configuration of a display device according to an example comparison.

FIG. 8 is a cross sectional view illustrating an example of a schematic configuration of a display device with flexibility according to an example comparison. The display device has an array substrate 101, a counter substrate 108, and a liquid crystal layer 109 interposed between the array substrate 101 and the counter substrate 108. A polarizing member 301 is placed on the backside of the array substrate 101. A polarizing member 304 is placed on the backside of the counter substrate 108. The liquid crystal layer 109 is sealed by a seal material 106a in a seal area 106. A bending start position of the display device with flexibility is indicated by reference sign 112a, and a bend portion 112 is on the right side of the bending start position 112a. Thus, in an area in which the seal material 106a is placed, the array substrate 101 and the counter substrate 108 are bent, so that the bend portion 112 is formed. When viewed in cross section, an end portion (shown by line X1) of the seal area 106 is placed on the left side of the bending start position 112a. Therefore, in the bend portion 112, the seal material 106a exists, but no liquid crystal layer 109 exists.

Figure 9:
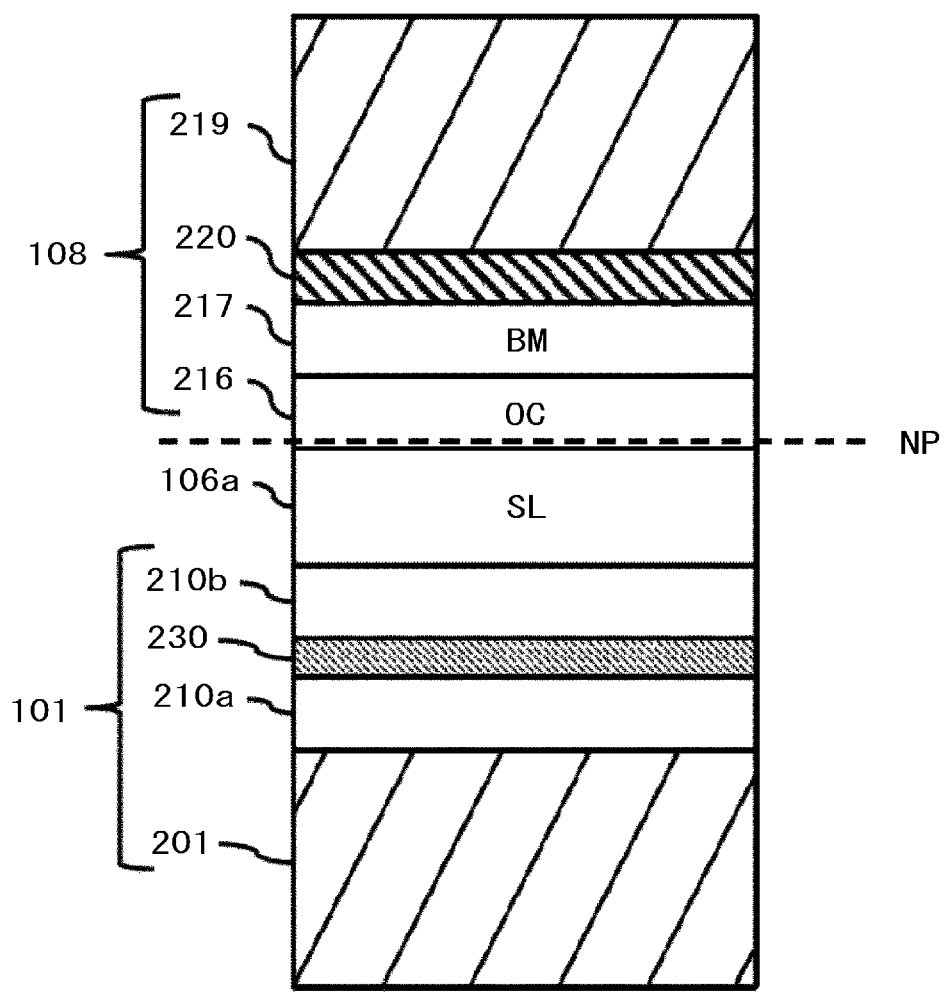
FIG. 9 is a cross sectional view illustrating a schematic configuration of a bend portion, taken along line A-A of FIG. 8.

FIG. 9 is a cross sectional view illustrating a schematic configuration of a bend portion, taken along line A-A of FIG. 8.

In the bend portion 112, the counter substrate 108 has: an overcoat layer (OC) 216 placed on the seal material (SL) 106a; a light shielding member (BM) 217 placed on the overcoat layer 216; an insulating film 220 made of inorganic insulation material and placed on the light shielding member 217; and a resin substrate 219 placed on the insulating film 220. The insulating film 220 is composed of an inorganic insulating film of silicon nitride (SiN), silicon oxide (SiO) and/or the like, and has a role of stopping moisture traveling from the resin substrate 219. The overcoat layer 216 is a layer for flattening the surface and is made of organic insulation material. The array substrate 101 has: a resin substrate 201; a first organic insulating layer 210a made of organic insulation material and placed on the resin substrate 201; wiring 230 placed on the first organic insulating layer 210a; and a second organic insulating layer 210b made of organic insulation material and placed on the wiring 230.

There has been the case where the wiring 230 has a break in the bend portion 112. A possible cause of a break in the wiring 230 is that, when the display device is bent at the bend portion 112, a crack (fissure, chapping) develops in the insulating film 220 made of an inorganic insulating film which is susceptible to bending, and in turn the crack developing in the insulating film 220 produces cracks in the overcoat layer 216 and/or the seal material 106a, and the cracks propagating from layer to layer extend to the wiring 230, resulting in a break in the wiring 230.

The inventors have studied neutral plane NP in a multilayer film. As well known, the neutral plane NP is a plane where compression strain and tensile strain do not occur when a rigid body is bent. It is known that the location of the neutral plane NP of the multilayer film depends on a film thickness and Young's modulus of each layer. In FIG. 9, the neutral plane NP is deemed to be located in proximity to the underside of the overcoat layer 216.

In the present invention, a break in the wiring 230 is prevented by the following configuration.

1) As illustrated in FIG. 4B described later, in the bend portion 112, the insulating film 220 itself in which a crack is produced is removed. Removing the insulating film 220 as a crack source enables the elimination of cracks in the insulating film 220, and thus the wiring 230 can be prevented from having a break.

2) As illustrated in FIG. 4C described later, in the bend portion 112, the insulating film 220 in which a crack is produced is formed into thin film. In the above item 1), the removal of the insulating film 220 itself results in a shift of the location of the neutral plane NP toward the array substrate 101 (in the downward direction) as compared with the location illustrated in FIG. 9. By the shift of the location of the neutral plane NP, the overcoat layer 216 and the light shielding member 217 are located away from the location of the neutral plane NP. This result in an increase in stress produced in the overcoat layer 216 and/or the light shielding member 217. Thus, more strain may be produced on the overcoat layer 216 and/or the light shielding member 217. If the overcoat layer 216 and/or the light shielding member 217 cannot withstand the amount of increased strain, a crack will be produced in the overcoat layer 216 and/or the light shielding member 217. To avoid this, the insulating film 220 is formed into a thin film for positional control of the neutral plane NP. This leads to a reduction of occurrence of cracks in the overcoat layer 216 and the light shielding member 217. It is noted that, generally, with consideration given to a defect ratio in the insulating film 220, it is hard to produce a crack in the insulating film 220 formed into thin film.

Embodiments according to the present invention will now be described with reference to the accompanying drawings.

It should be understood that the disclosure is merely illustrative, and any appropriate change which can be easily conceived within the spirit of the present invention by those skilled in the art is certainly encompassed within the scope of the present invention. Also, to further clarify the description, in some cases, the figures show a schematic representation of width, thickness, shape, and the like of each portion in comparison with actual form. However, the drawings are merely illustrative and are therefore not to be considered limiting the interpretation of the present invention.

Also, throughout the specification and drawings, elements similar or identical to those previously mentioned in the previously discussed figures are indicated with like reference signs and sometimes details will not be described appropriately.

In the embodiments, a liquid crystal display device is disclosed as an example of the display devices. The liquid crystal display device can be used in various types of apparatus such as smartphones, tablet terminals, mobile telephone terminals, personal computers, television sets, vehicle-installed devices, game hardware, and the like.

It is noted that, in the specification and claims appended thereto, when the figures are described, the words "up/upward", "down/downward", and the like are used to represent a relative positional relationship between a structure of interest and another structure. In a specific example, when viewed from the side, a direction from a first substrate (array substrate) toward a second substrate (counter substrate) is defined as "up/upward" direction, and the direction opposite to this is defined as "down/downward" direction.

Also, the words "inner/inward" and "outer/outward" are used to represent a relative positional relationship between two parts with reference to a display area. That is, the word "inner/inward" refers to the side relatively closer to the display area than one part is located, and the word "outer/outward" refers to the side relative farther away from the display area than the one part is located. However, the definition of "inner/inward" and "outer/outward" as used herein is applied to the condition of the liquid crystal display device not being bent.

The term "display device" refers to the display devices in general using a display panel to display video. The term "display panel" refers to a structure using an electrooptic layer to display video. For example, the term display panel may refer to a display cell containing an electrooptic layer, or alternatively may refer to a structure with another optical member (e.g., a polarizing member, a backlight, a touch panel and the like) mounted to a display cell. The "electrooptic layer" as used herein can include a liquid crystal layer, an electrochromic (EC) layer, and the like unless technical inconsistency arises. Therefore, in the following embodiments, a liquid crystal panel including a liquid crystal layer is described as an example of a display panel, but no application to a display panel including another electrooptic layer as described above is excluded.

EMBODIMENTS

Figure 1:
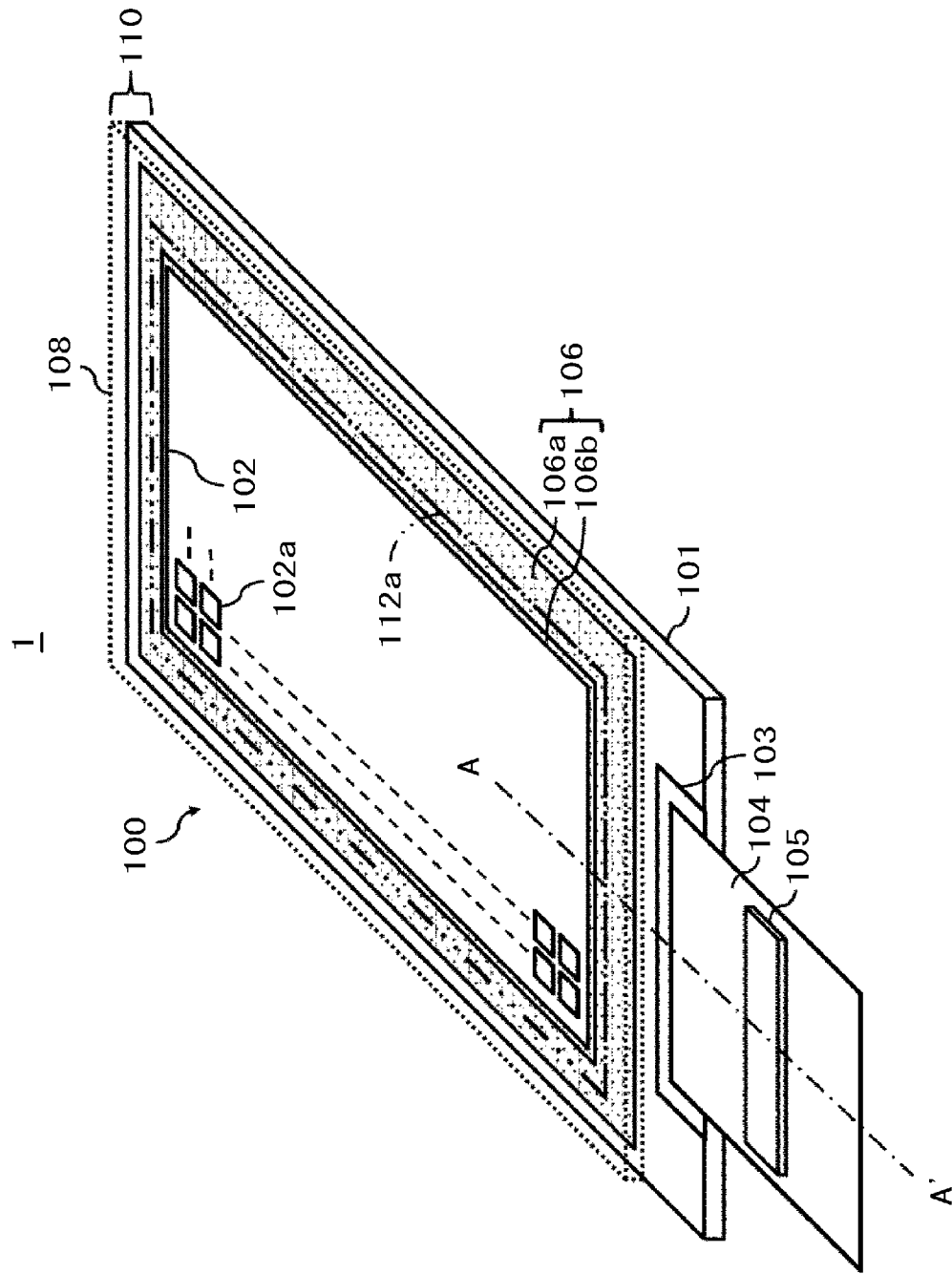
FIG. 1 is a perspective view illustrating a schematic configuration of a display device according to embodiments.

A display device 1 according to the embodiments has a display panel 100. A schematic configuration of a liquid crystal panel as an example of the display panel 100 will now be described. FIG. 1 is a perspective view illustrating the schematic configuration of the display device 1 according to the embodiments.

The display panel 100 has the array substrate 101, the display portion 102, a terminal portion 103, a flexible printed circuit board 104, a drive circuit 105, a seal area 106, and the counter substrate 108. The display panel 100 has a display area and a frame area defined around the display area, in which the display portion 102 corresponds to the display area and the seal area 106 corresponds to the frame area. The seal area 106 is formed in a frame shape in such a manner as to surround the display portion 102. The seal area 106 includes a seal material 106a and a sealing portion 106b for preventing the seal material 106a to enter the display portion 102. It is noted that, for a simple description, optical members such as a polarizing member, a backlight and the like are not illustrated in FIG. 1, but the optical members will be described later. It should be understood that the display panel 100 is not limited to be a rectangular shape and may be formed in another shape.

The array substrate 101 is a substrate having a plurality of pixels 102a arranged on a substrate with flexibility (e.g., a resin substrate of polyimide and/or the like), the pixels 102a including thin-film transistors and pixel electrodes connected to the thin-film transistors. The display portion 102 is an area configured with an array of the plurality of pixels 102a in rows and columns. The display portion 102 may sometimes be referred to as a display area.

Each of the pixels 102a includes a circuit using a thin-film transistor as a switching element. In each of the pixels 102a, the ON/OFF operation of the switching element is controlled in response to a video signal provided, in order to perform orientation control on the liquid crystal layer corresponding to the pixel electrode of each of the pixels 102a. That is, the above-described display portion 102 refers to an area including the thin-film transistors and the pixels provided with a video signal via the thin-film transistors (sometimes hereinafter referred to as "first pixels").

Figure 2:
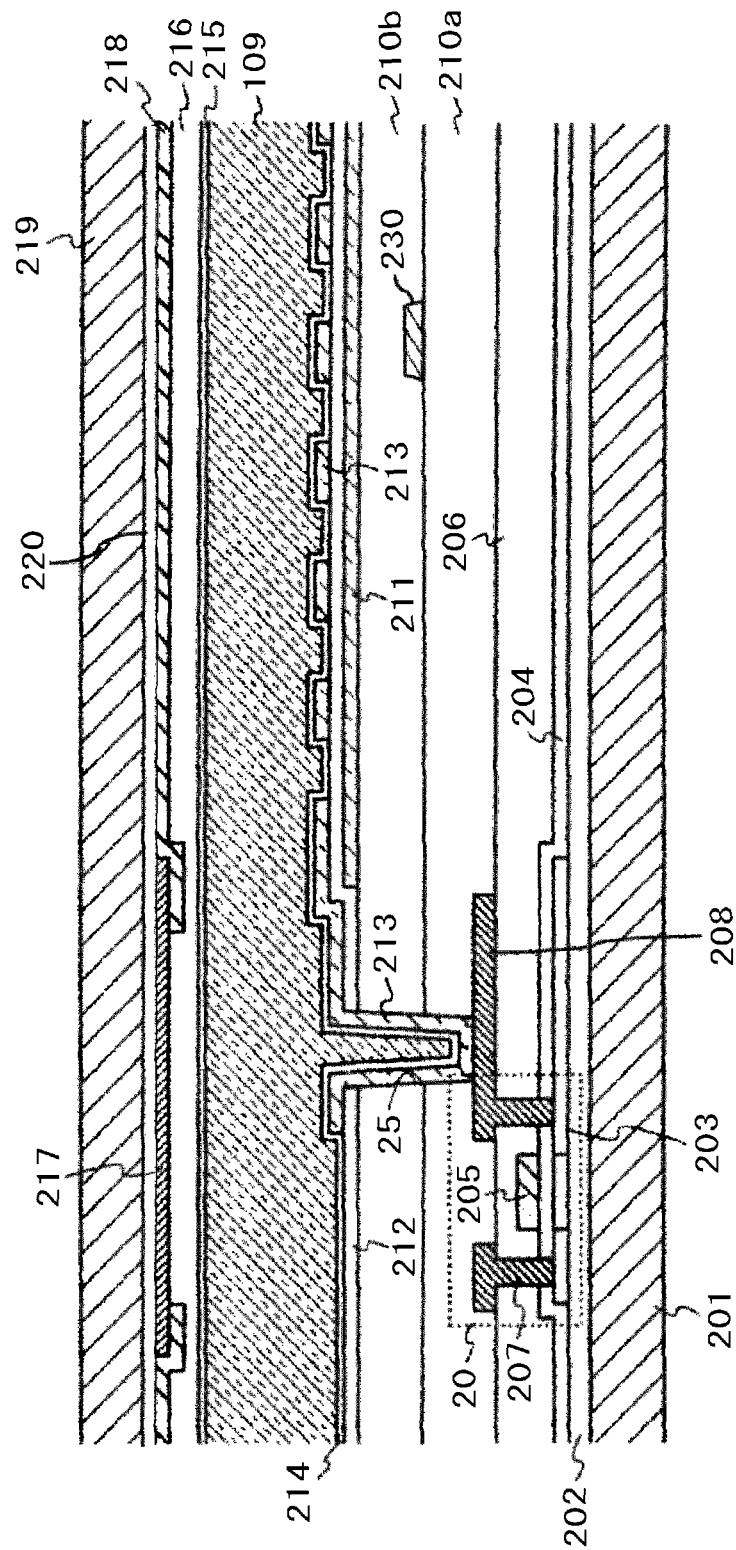
FIG. 2 is a cross-sectional view illustrating the configuration of pixel structure of a display panel according to the embodiments.

Here, the pixel 102a which is a first pixel is briefly described. FIG. 2 is a cross-sectional view illustrating the configuration of pixel structure of the display panel 100 according to the embodiments.

In FIG. 2, a primary layer 202 composed of inorganic insulation material is placed on the surface of the resin substrate (first resin substrate) 201 composed of resin material such as polyimide and/or the like. A thin-film transistor 20 is placed on the primary layer 202.

The thin-film transistor 20 includes a semiconductor layer 203, a gate insulating layer 204, a gate electrode 205, an insulating layer 206, a source electrode 207, and a drain electrode 208. All those elements can be formed of well-known materials.

The first organic insulating layer 210a and the second organic insulating layer 210b which are composed of organic insulating films of acrylic and/or the like are placed on the thin-film transistor 20 to flatten the asperities caused by the thin-film transistors 20. The wiring 230 is placed on the first organic insulating layer 210a, and the second organic insulating layer 210b is placed on the first organic insulating layer 210a and the wiring 230. The wiring 230 is connected to the source electrode 207, a common electrode 211 described below, and the like, for example. The wiring 230 includes wiring connected to the drive circuit 105. The common electrode (ITO) 211 composed of a transparent conductive film of ITO (Indium Tin Oxide) and/or the like is located on the second organic insulating layer 210b. A pixel electrode 213 is located via an insulating layer (second inorganic insulating layer) 212 on the common electrode 211.

As the insulating layer 212, by way of example and not limitation, an inorganic insulating film of a silicon oxide film, a silicon nitride film, or the like may be used. Also, similarly to the common electrode 211, the pixel electrode 213 is composed of a transparent conductive film of ITO and/or the like. The common electrode 211 may be referred to as a first transparent electrode and the pixel electrode 213 may be referred to as a second transparent electrode. The pixel electrode 213 is electrically connected to the drain electrode 208 via a contact hole 25 which is formed through the first organic insulating layer 210a, the second organic insulating layer 210b, and the insulating layer 212. It is noted that, in FIG. 2, there seem to be a plurality of pixel electrodes 213, but an actual pixel electrode 213 in planar view has a pattern shape with multiple slits formed therein. Stated in another way, the pixel electrode 213 in planar view has a shape having multiple linear electrodes arranged adjacent to each other and connected at their ends to each other. Also, FIG. 2 illustrates an example configuration of one contact hole 25 formed through the first organic insulating layer 210a, the second organic insulating layer 210b, and the insulating layer 212, which is not intended to be limiting. For example, the following configuration is possible. A first contact hole is formed through the first organic insulating layer 210a, metal wiring formed in the same layer as the wiring 230 is placed to cover the first contact hole, and the metal wiring and the drain electrode 208 are electrically connected to each other. A second contact hole is formed through the second organic insulating layer 210b and the insulating layer 212 and the pixel electrode 213 and the metal wiring are connected to each other.

In the embodiment, an electric field (called fringe electric field) is created between the common electrode 211 and the pixel electrode 213, so that the liquid crystal orientation is controlled by the electric field. Such a liquid crystal display mode is called FFS (Fringe Field Switching) mode. However, as the liquid crystal display mode, in addition to the FFS mode, any other liquid crystal display mode may be employed. For example, an IPS (In-Plain Switching) mode may be used, in which a horizontal electric field is utilized by being created using the pixel electrode and the common electrode which are formed in the same layer. Alternatively, a VA (Vertical Alignment) mode may be used, in which a vertical electric field is created between the pixel electrode placed on the array substrate and the common electrode placed on the counter substrate, and the vertical electric field is used to control the liquid crystal orientation.

An orientation film 214 is placed on the pixel electrode 213. In the embodiment, the elements from the resin substrate 201 to the orientation film 214 are collectively referred to as the array substrate 101. It is noted that a video signal is provided to the pixel electrode 213 via the thin-film transistor 20. The video signal is provided to the source electrode 207 of the thin-film transistor 20, which is then communicated to the drain electrode 208 by the control of the gate electrode 205. As a result, the video signal is provided from the drain electrode 208 to the pixel electrode 213.

The liquid crystal layer 109 is held on the orientation film 214. As described above, the liquid crystal layer 109 is held by being surrounded with the seal area 106 between the array substrate 101 and the counter substrate 108. Stated in another way, the seal area 106 is formed in a frame shape to surround the liquid crystal layer 109. It is noted that, as described later, a plurality of spacers SP are created between the array substrate 101 and the counter substrate 108.

Another orientation film 215 on the counter substrate 108 side is placed on the liquid crystal layer 109. The overcoat layer (overcoat film) (OC) 216 is placed on the orientation film 215. The overcoat layer 216 is placed to flatten the asperities caused by the light shielding member (BM) 217 and a color filter member (CF) 218, the light shielding member (BM) 217 being composed of resin material containing a black pigment or black metal material, and the color filter member (CF) 218 being composed of resin material containing pigments or dyes corresponding to RGB colors.

The inorganic insulating film (first inorganic insulating film) 220 of silicon nitride (SiN), silicon oxide (SiO), and/or the like, is placed on the light shielding member 217 and the color filter member 218. The resin substrate (second resin substrate) 219 composed of resin material of polyimide and/or the like is placed on the inorganic insulating film 220. In actuality, the counter substrate 108 is configured by laminating the light shielding member 217, the color filter member 218, the overcoat layer 216, and the orientation film 215 on one of the surfaces of the resin substrate 219. In the case where the resin substrate 219 exhibits high moisture permeability, the inorganic insulating film 220 is formed between the resin substrate 219 and the color filter member 218 in order to enhance watertightness or mitigate the stress.

In this manner, the display portion 102 in the embodiment has the plurality of pixels 102a having the structure as described using FIG. 2.

Referring back to FIG. 1, the terminal portion 103 is a terminal to provide a video signal externally provided, and the like to the display portion 102. Specifically, the terminal portion 103 is configured by integrating wiring connected to each pixel 102a.

The flexible printed circuit board 104 is electrically connected to the terminal portion 103 to provide a video signal, a drive signal and the like which are externally provided. The flexible printed circuit board 104 has a configuration of a plurality of wires arranged on a resin film, and is bonded to the terminal portion 103 via an anisotropic conductive film and/or the like. The drive circuit 105 incorporated in an IC chip is mounted on the flexible printed circuit board 104.

The drive circuit 105 provides, to the display portion 102, a video signal to be provided to the pixel electrode of each pixel 102a, and a drive signal for control on the thin-film transistor of each pixel 102a. It is noted that FIG. 1 illustrates an example where the drive circuit 105 incorporated in an IC chip is mounted on the flexible printed circuit board 104 in order to control the thin-film transistor included in each of the pixels 102a. However, a thin-film transistor can be used to install a drive circuit such as a gate driver circuit or a source driver circuit around the display portion 102. The drive circuit 105 incorporated in an IC chip can be placed on the array substrate 101 on the outside of the seal area 106 by use of COG (Chip On Glass) techniques.

The seal area 106 is located between the array substrate 101 and the counter substrate 108, so that the array substrate 101 and the counter substrate 108 are bonded together, and the liquid crystal layer 109 (see FIG. 2) is held between the array substrate 101 and the counter substrate 108. It is noted that, to clarify the figure, the counter substrate 108 is shown by dashed lines in FIG. 1. Although not shown in FIG. 1, the counter substrate 108 includes the light shield member and the color filter member. Incidentally, a structure including the array substrate 101, the seal area 106, the counter substrate 108, and the liquid crystal layer 109 is hereinafter referred to as a liquid crystal cell 110.

The seal area 106 is formed to surround the liquid crystal layer 109 placed in the display portion 102, and has a role in preventing intrusion of moisture and oxygen from the outside. The seal area 106 includes the seal material 106a composed of a resin member and the sealing portion 106b having a role as a weir or bank to prevent the inner located liquid crystal layer 109 from flowing out into the outer located seal area 106. The sealing portion 106b also has a role of preventing the outer located seal material 106a from flowing out into the inner located liquid crystal layer 109.

The sealing portion 106b includes a member composed of a resin member placed inward of the seal material 106a and separately from the seal material 106a. Specifically, the sealing portion 106b includes a resin member placed on the outside of the display portion 102, that is, placed along the outer perimeter of the display portion 102. When the liquid crystal cell 110 is bent, the sealing portion 106b acts to ensure a cell gap in a bent portion and prevent a misalignment between the array substrate 101 and the counter substrate 108.

In FIG. 1, a broken line 112a shown between the inside of the seal area 106 and the outside of the seal area 106 or between the outside of the sealing portion 106b and the outside of the seal area 106 indicates the bending position (bending start position) of the display panel 100. In this manner, the bending position of the liquid crystal cell 110 shown by the broken line 112a is set between the inside of the seal area 106 and the outside of the seal area 106 or between the outside of the sealing portion 106b and the outside of the seal area 106. In the embodiment, the bending position is set on the outside of the display portion 102. One reason is that, if the liquid crystal layer 109 exists in the bend portion (112) as a bending portion shown in FIG. 3 as described later, display irregularities may occur. The liquid crystal layer 109 is designed not to be located in the bend portion (112) in order to prevent occurrence of display irregularities.

It is noted that FIG. 1 illustrates an example where the four sides of the rectangle-shaped liquid crystal cell 110 are bent, in which the sealing portion 106b is depicted to be located in positions corresponding to the four sides of the liquid crystal cell 110. If the bend portion (112) is located on one of the four sides of the liquid crystal cell 110, the sealing portion 106b is placed in a position corresponding to only the one side. Likewise, if the bend portion is located on two of the four sides of the liquid crystal cell 110, the sealing portion 106b is placed in a position corresponding to the two sides. That is, the sealing portion 106b may be placed in at least a position corresponding to the bent sides of the liquid crystal cell 110. Also, FIG. 1 illustrates an example of the liquid crystal cell 110 of a rectangular shape. If two or more sides are bent, a corner between adjacent sides will become an unnecessary area in the bending process. In this case, the liquid crystal cell 110 (the array substrate 101 and the counter substrate 108) may be formed to have notch structure at a corner, rather than in a rectangular shape. If the notch structure is outside the seal area 106, the notch structure can be formed without influence on display.

Figure 3:
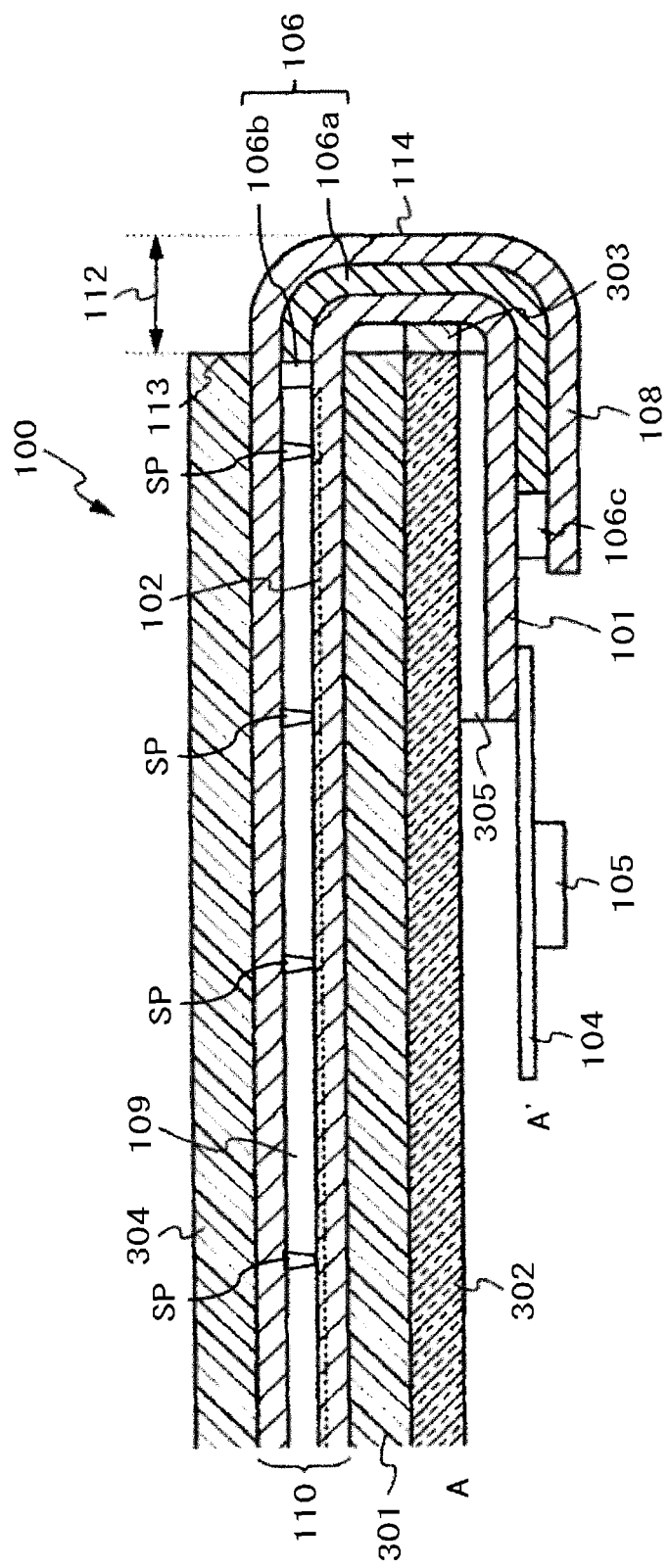
FIG. 3 is a diagram illustrating a cross-sectional configuration in a display panel according to the embodiments.

FIG. 3 is a diagram illustrating the cross-sectional configuration in the display panel 100 according to the embodiments. Specifically, in FIG. 3, the display panel 100 illustrated in FIG. 1 is cut along a dot-and-dash line shown by section A-A', and a part of the section A-A' is bent.

In FIG. 3, of the two surfaces of the array substrate 101, one (facing face) facing toward the counter substrate 108 is defined as a frontside, and the other surface of the array substrate 101 is defined as a backside. Likewise, of the two surfaces of the counter substrate 108, one (facing face) facing toward the array substrate 101 is defined as a frontside, and the other surface of the counter substrate 108 is defined as a backside. Therefore, the liquid crystal layer 109 is sandwiched and held between the frontside of the array substrate 101 and the frontside of the counter substrate 108 on the inner side of the seal area 106 or on the inner side of the sealing portion 106b.

In the display panel 100 according to the embodiment, on the backside of the array substrate 101, the polarizing member 301, a light guiding member 302, and a light source 303 are arranged in such a manner as to be superimposed on the display portion 102. The polarizing member 301 and the light guiding member 302 are configured to be held by the backside of the array substrate 101. Specifically, the polarizing member 301 and the light guiding member 302 are sandwiched between an inner portion and an outer portion of the backside of the array substrate 101 with respect to the bend portion 112 described later. Also, the light source 303 is placed on a lateral side face of the light guiding member 302 to face the bend portion 112 described later. As the light source 303, for example, a LED light source may be used. The light guiding member 302 and the light source 303 form an illuminating device (backlight). The configuration of the illuminating device (backlight) is not limited to the example in FIG. 3, and the illuminating device may be configured to provide light required for image display.

Also, the polarizing member 304 is placed on the backside of the counter substrate 108. In this manner, light emitted from the light source 303 is guided to the polarizing member 301 by the light guiding member 302, and is recognized by a viewer through the liquid crystal cell 110 and the polarizing member 304. It is noted that, in the scope of the specification and claims appended thereto, an optically acting member such as the polarizing member, the light guiding member, and the light source may sometimes be referred to as an "optical member".

It is noted that the example where the polarizing member and the illuminating device are provided as other members in addition to the liquid crystal cell 110 is illustrated herein, but still other optical members (such as a phase difference plate, an antireflective plate and the like) or a touch panel may be provided. As those optical members and touch panel, well-known members or well-known structure may be used.

Incidentally, in the display panel 100 according to the embodiment, a substrate having flexibility (e.g., resin substrate) is used as a support substrate for the array substrate 101. Because of this, the array substrate 101 entirely has flexibility. Likewise, a substrate having flexibility is used as a support substrate for the counter substrate 108, and thus the counter substrate 108 also entirely has flexibility. Therefore, the display panel 100 according to the embodiment is able to be bent, as illustrated in FIG. 3, such that the flexible printed circuit board 104 is located on the backside side of the liquid crystal cell 110.

In the display panel 100 according to the embodiment, a portion bent so as to be folded is called a "bend portion". The display panel 100 has the bend portion 112 in the seal area 106. The bend portion 112 may also be referred to as a frame area. That is, in planar view, the display panel 100 is bent such that an inner portion of the backside of the array substrate 101 with respect to the bend portion 112 and an outer portion of the backside of the array substrate 101 with respect of the bend portion 112 are superimposed. At this time, because the liquid crystal cell 110 is bent along the broken line 112a shown in FIG. 1, a portion of the seal area 106 is located on the backside side of the display panel 100. In other words, the display panel 100 has the seal area 106 partially facing the backside of the array substrate 101.

The seal area 106 includes the seal material 106a and the sealing portion 106b as described in FIG. 1. In FIG. 3, for example, the sealing portion 106b can be formed by coating the frontside of the counter substrate 108 with a resin material of acrylic and/or the like and then using photolithography to perform patterning.

A plurality of spacers SP are placed in the display portion 102 of the liquid crystal cell 110 in order to ensure a cell gap between the frontside of the array substrate 101 and the frontside of the counter substrate 108. Each of the spacers SP is formed in a pillar shape of resin material of acrylic and/or the like. The cell gap between the frontside of the array substrate 101 and the frontside of the counter substrate 108 is filled with and holds the liquid crystal layer 109. The plurality of spacers SP are placed on the frontside of the counter substrate 108, for example. The plurality of spacers SP are formed by coating the counter substrate 108 with resin material and then using photolithography to perform patterning. The pillar-shaped spacers SP composed of resin material include main spacers that are in contact with the array substrate 101, and secondary spacers that are out of contact with the array substrate 101, under usual use conditions.

As described above, the display panel 100 according to the embodiment is structured to have the bend portion 112 on the outer side of the sealing portion 106b in the seal area 106. This prevents the liquid crystal layer 109 from entering the seal area 106. On the contrary, the seal material 106a is also prevented from entering the display portion 102. Therefore, there is no liquid crystal layer 109 in the bend portion 112. As a result, it is possible to prevent occurrence of display irregularities in the vicinity of the bend portion 112.

It is noted that, as illustrated in FIG. 3, an adhesion portion 106c, which is composed of a resin material, may be placed on the outer side of the seal area 106, that is, in a portion of the outer perimeter area of the seal area 106. The adhesion portion 106c has a role of preventing the seal material 106a from flowing out to the outside of the seal area 106.

FIGS. 4A to 4C are cross-sectional views illustrating schematic layer configurations of the display portion and the bend portion of the display panel according to the embodiments, in which FIG. 4A is the cross-sectional view illustrating the schematic configuration of the display portion, FIG. 4B is the cross-sectional view illustrating the schematical configuration of the bend portion, and FIG. 4C is the cross-sectional view illustrating the configuration according to a first modification of the bend portion in outline.

Referring to FIG. 4A, in the display portion 102, the counter substrate 108 has: the overcoat layer (OC) 216 placed on the liquid crystal layer 109; the light shielding member (BM) 217 and the color filter member (CF) 218 which are placed on the overcoat layer 216; an insulating film (first inorganic insulating film) 220 placed on the light shielding member 217 and the color filter member 218; and the resin substrate (second rein substrate) 219 placed on the insulating film 220. The inorganic insulating film 220, the light shielding member 217, the color filter member 218, and the overcoat layer 216 may be collectively referred to as a first multilayer layer. The insulating film 220 functions as a barrier layer preventing moisture from traveling from the resin substrate 219 toward the liquid crystal layer. Incidentally, the orientation film 215 of the counter substrate 108 is not shown in FIG. 4A for figure simplicity.

Referring to FIG. 4A, in the display portion 102, the array substrate 101 has the resin substrate 201, an insulating layer (first inorganic insulating layer) 240 placed on the resin substrate 201, and the first organic insulating layer 210a placed on the insulating layer 240, in which the insulating layer 240 is represented as an insulating layer made of a multilayer inorganic insulation material including the primary layer 202, the gate insulating layer 204, and the insulating layer 206. The insulating layer 240 is formed from silicon nitride (SiN), silicon oxide (SiO), and/or the like, and functions as a barrier layer preventing moisture from traveling from the resin substrate 201 toward the liquid crystal layer.

Further, the array substrate 101 has the wiring 230 placed on the first organic insulating layer 210a, the second organic insulating layer 210b placed on the wiring 230, the common electrodes (ITO) 211 placed on the second organic insulating layer 210b, and the insulating layer (second insulating layer) 212 placed on the common electrodes 211. The wiring 230 is made of a single-layer or multilayer metal material such as of titanium (Ti), aluminum (Al), molybdenum (Mo), tungsten (W), and/or the like. The insulating layer 240, the first organic insulating layer 210a, the wiring 230, and the second organic insulating layer 210b may be collectively referred to as a third multilayer layer. Incidentally, for figure simplicity, FIG. 4A does not show the semiconductor layer 203, the gate electrode 205, the source electrode 207, the drain electrode 208, the pixel electrode 213, and the orientation film 214 in the array substrate 101.

Referring to FIG. 4B, in the bend portion 112, the counter substrate 108 has the overcoat layer (OC) 216 placed on the seal material (SL) 106a, the light shielding member (BM) 217 placed on the overcoat layer 216, and the resin substrate 219 placed on the light shielding member 217. The light shielding member 217 and the overcoat layer 216 may be collectively referred to as a second multilayer layer.

In bend portion 112, the array substrate 101 has the resin substrate 201, the first organic insulating layer 210a placed on the resin substrate 201, the wiring 230 placed on the first organic insulating layer 210a, and the second organic insulating layer 210b placed on the wiring 230. The first organic insulating layer 210a, the wiring 230 and the second organic insulating layer 210b may be collectively referred to as a fourth multilayer layer.

In short, the insulating film 220, the insulating layer 212, and the insulating layer 240 (the primary layer 202, the gate insulating layer 204, and the insulating layer 206) are formed in the display portion 102, but are removed in the bend portion 112.

In FIG. 4B, FIG. 4B differs from FIG. 9 in that the insulating film 220 made of an inorganic insulation material and placed on the light shielding member 217 is removed. That is, in the bend portion 112, the insulating film 220 itself in which a crack is generated is removed.

Therefore, because of removal of the insulating film 220 as a crack source, elimination of crack in the insulating film 220 is enabled, and thus the wiring 230 can be prevented from having a break.

In FIG. 4C according to the first modification, FIG. 4C differs from FIG. 4B in that an insulating film (second inorganic insulating film) 220a with a thin film thickness is placed on the light shielding member 217. The insulating film 220a is composed of an inorganic insulating film of silicon nitride (SiN), silicon oxide (SiO) and/or the like. That is, the insulating film 220a with a thin film thickness is placed between the resin substrate (second resin substrate) 219 and the second multilayer layer (217, 216). The remaining configuration is the same as that in FIG. 4B, and therefore is not described.

As illustrated in FIG. 4C, a film thickness d1 of the insulating film 220a in the bend portion 112 is designed to be thinner than a film thickness d2 of the insulating film 220 in the display portion 102 illustrated in FIG. 4A (d1>d2).

The film thickness d2 of the insulating film 220 is, for example, on the order of 500 nm (nanometer), and the film thickness d1 of the insulating film 220a is, for example, on the order of 100 nm to 125 nm (the film thickness d1 is the order of one-fourth to one-fifth of the film thickness d2).

As illustrated in FIG. 4B, in the bend portion 112, if the insulating film 220 itself is removed, this results in a shift of the location of the neutral plane NP toward the array substrate 101 (in the downward direction) as compared with the location of the neutral plane NP illustrated in FIG. 9. By shifting the location of the neutral plane NP, the overcoat layer 216 and the light shielding member 217 are located away from the neutral plane NP. This results in an increase in stress produced in the overcoat layer 216 and/or the light shielding member 217. Thus, there is a risk of producing more strain on the overcoat layer 216 and/or the light shielding member 217. If the overcoat layer 216 and/or the light shielding member 217 cannot withstand the amount of increased strain, a crack will be produced in the overcoat layer 216 and/or the light shielding member 217. To avoid this, as illustrated in FIG. 4C, the insulating film 220a with thin film thickness is placed in order to control the location of the neutral plane NP.

This reduces the occurrence of a crack in the overcoat layer 216 and the light shielding member 217. With consideration given to a defect ratio in the insulating film 220a, it is hard to produce a crack in the insulating film 220a with thin film thickness, thereby preventing a break in the wiring 230.

Also, because the insulating film 220a with thin film thickness is placed between the resin substrate 219 and the light shielding member 217, if the resin substrate 219 exhibits high moisture permeability, watertightness in the bend portion 112 can be enhanced.

A method of manufacturing the counter substrate 108 will be described below.

Figure 5:
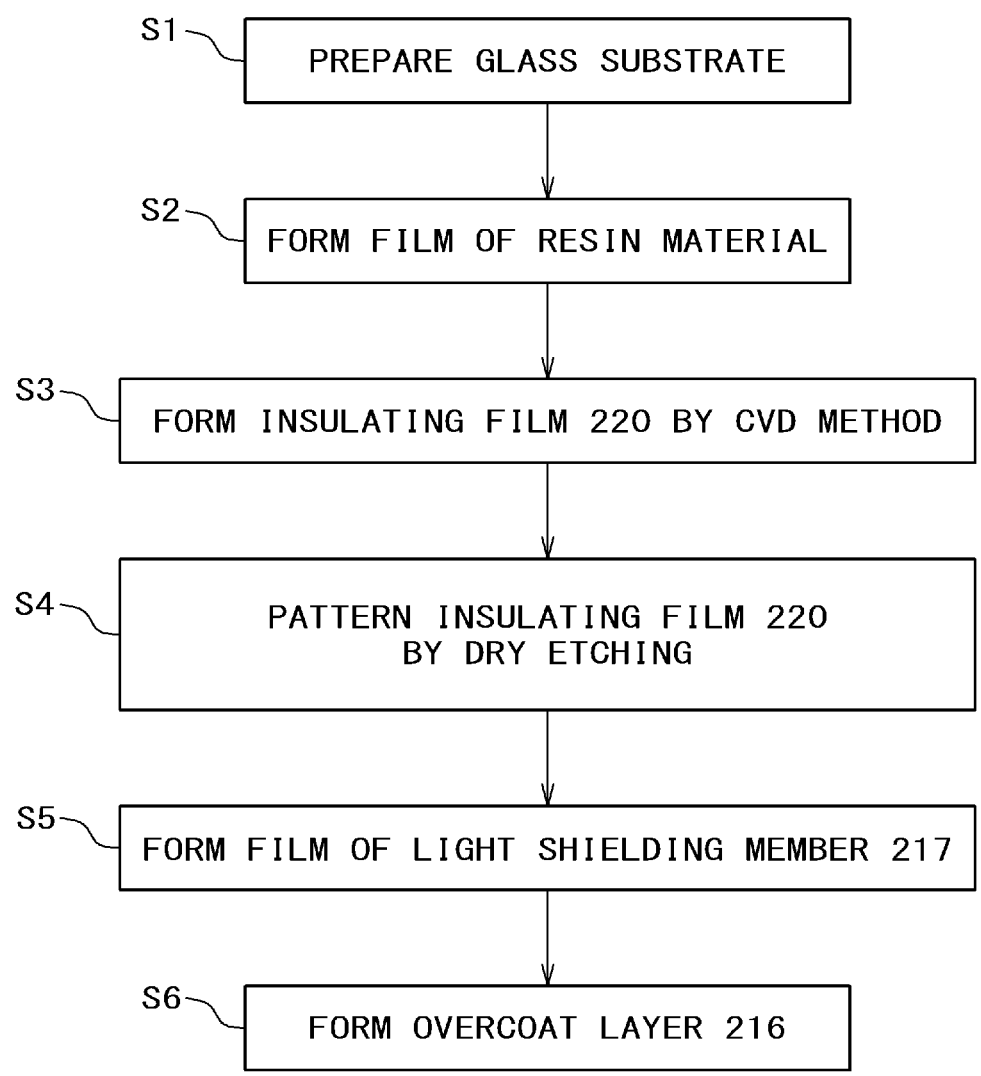
FIG. 5 is a flowchart illustrating a method of manufacturing a counter substrate according to the embodiments.

FIG. 5 is a flowchart illustrating a method of manufacturing a counter substrate according to the embodiments. Here, a description is given of a method of manufacturing the counter substrate 108 when the insulating film 220 is formed by a CVD (Chemical Vapor Deposition) method.

Step S1: a glass substrate is prepared.

Step S2: then, resin material of polyimide and/or the like is formed into a film on the glass substrate to form a resin substrate 219.

Step S3: then, an insulating film 220 of silicon nitride, silicon oxide and/or the like is formed on the resin substrate 219 by a CVD method.

Step S4: then, a portion of the insulating film 220 corresponding to the bend portion 112 is patterned by dry etching so that the portion of the insulating film 220 corresponding to the bend portion 112 is entirely or partially removed. In the case of FIG. 4B, the portion of the insulating film 220 corresponding to the bend portion 112 is entirely removed. In the case of FIG. 4C, the portion of the insulating film 220 corresponding to the bend portion 112 is partially removed and an insulating film 220a with thin film thickness is formed. The insulating film 220 corresponding to the display portion 102 is masked to prevent it from being patterned by the dry etching.

Step S5: then, resin material containing a black pigment or a black metal material is used for film formation for the light shielding member 217. In the case of FIG. 4B, the light shielding member 217 is formed, through film formation, on the insulating film 220 in the display portion 102 and on the resin substrate 219 in the bend portion 112. In the case of FIG. 4C, the light shielding member 217 is selectively formed, through film formation, on the insulating film 220 in the display portion 102 and on the insulating film 220a in the bend portion 112. Although not shown, a step of selectively forming the color filter member 218 through film formation is added for the display portion 102.

Step S6: then, an overcoat layer 216 is formed on the light shielding member 217 and the color filter member 218.

As a result, the counter substrate 108 is formed.

Figure 6:
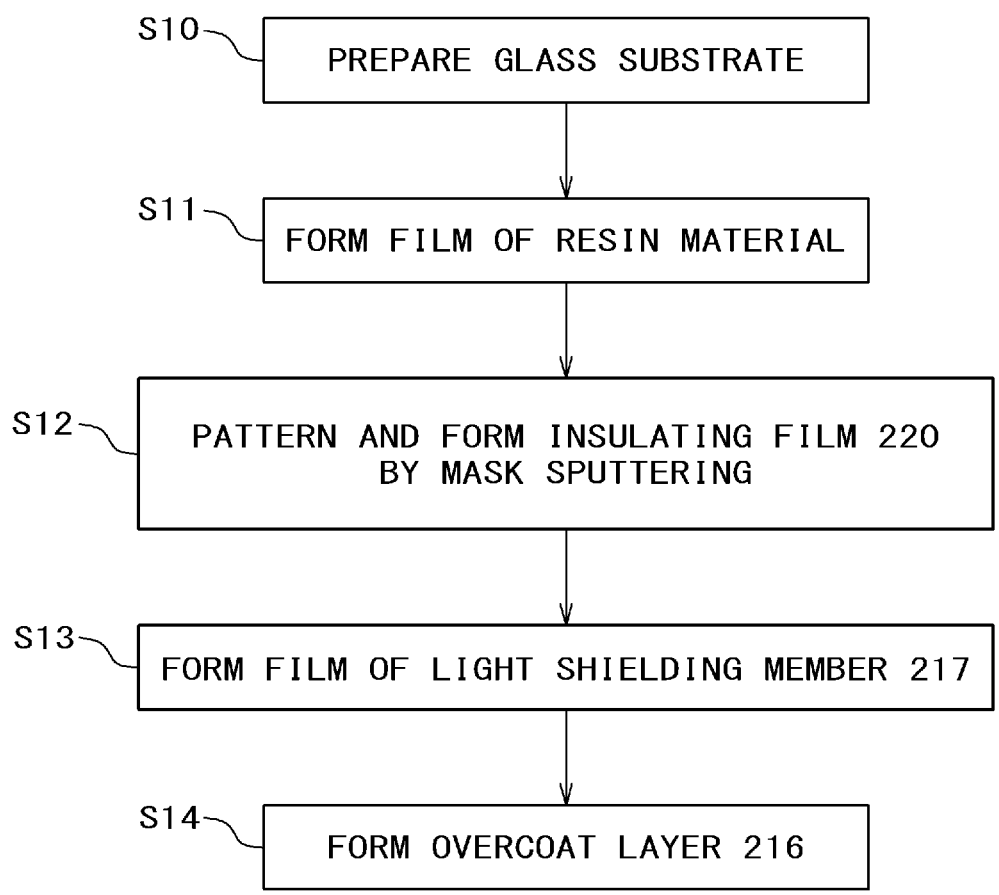
FIG. 6 is a flowchart illustrating another method of manufacturing a counter substrate according to the embodiments.

FIG. 6 is a flowchart illustrating another method of manufacturing a counter substrate according to the embodiments. Here, a description is given of a method of manufacturing the counter substrate 108 when the insulating film 220 is formed by a sputtering method.

Step S10: a glass substrate is prepared.

Step S11: then, a resin material of polyimide and/or the like is formed into a film on the glass substrate to form a resin substrate 219.

Step S12: an insulating film 220 is formed and patterned on the resin substrate 219 by mask sputtering. In the case of FIG. 4B, the portion of the resin substrate 219 corresponding to the bend portion 112 is masked so that the insulating film 220 is prevented from being formed. In the case of FIG. 4C, several approaches may be taken. For example, an insulating film 220a with a desired film thickness is produced on the resin substrate 219, and subsequently, a portion of the insulating film 220a corresponding to the bent portion 112 is masked, and then sputtering is again performed to form an insulating film 220 in the display portion 102.

Step S13: then, resin material containing a black pigment or black metal material is used for film formation for light shielding member 217. In the case of FIG. 4B, the light shielding member 217 is selectively formed, through film formation, on the insulating film 220 in the display portion 102 and on the resin substrate 219 in the bend portion 112. In the case of FIG. 4C, the light shielding member 217 is selectively formed, through film formation, on the insulating film 220 in the display portion 102 and on the insulating film 220a in the bend portion 112. Although not shown, for the display portion 102, a step of using film formation to form selectively the color filter member 218 is added.

Step S14: then, an overcoat layer 216 is formed on the light shielding member 217 and the color filter member 218.

As a result, the counter substrate 108 is formed.

Further modifications will be described below with reference to the accompanying drawings.

Figure 7A:
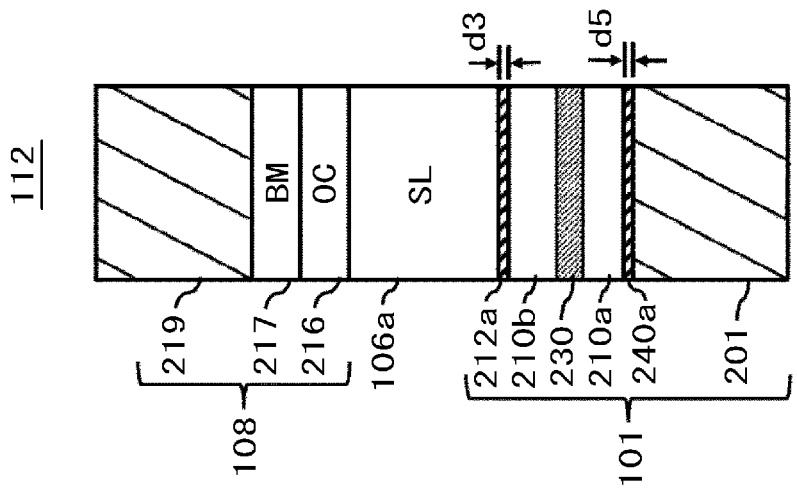
Figure 7B:
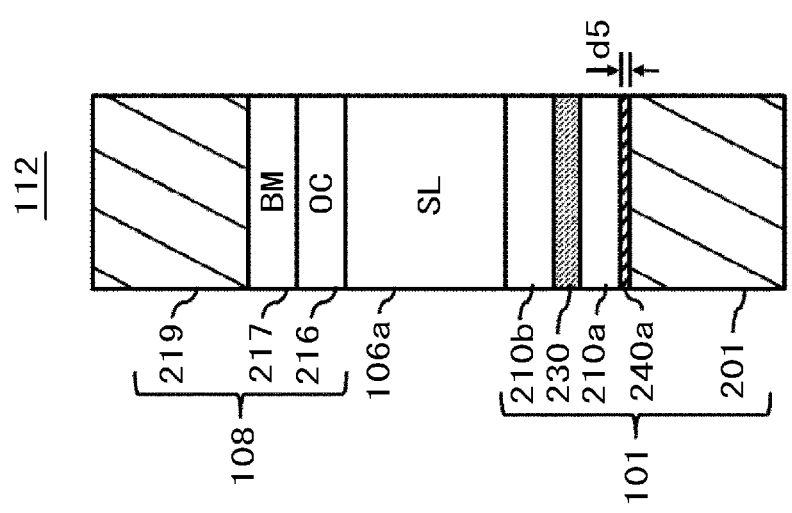
Figure 7C:
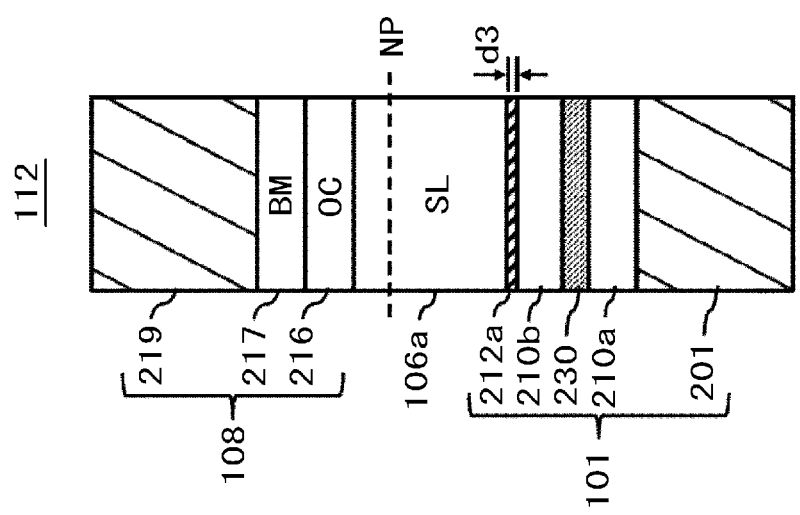

FIGS. 7A to 7C are cross-sectional views illustrating schematic configurations of bend portions according to the second to fourth modifications. FIG. 7A is the cross-sectional view illustrating the schematic configuration of the bend portion according to the second modification. FIG. 7B is the cross-sectional view illustrating the schematic configuration of the bend portion according to the third modification. FIG. 7C is the cross-sectional view illustrating the schematic configuration of the bend portion according to the fourth modification. As illustrated in FIG. 4B, in the bend portion 112, the removal of the insulating film 220 results in a shift of the location of the neutral plane NP in the downward direction. In the second to fourth modifications, it is assumed that no crack is produced in the overcoat layer 216 and the light shielding member 217 even if the neutral plane NP is shifted downward.

In the second modification illustrated in FIG. 7A, FIG. 7A differs from FIG. 4B in that an insulating layer (third inorganic insulating layer) 212a with thin film thickness is placed on the second organic insulating layer 210b or between the second organic insulating layer 210b and the seal material 106a. That is, the insulating layer 212a is placed between the seal material 106a and the fourth multilayer layer (210a, 230, 210b). The insulating layer 212a is composed of an inorganic insulating film of silicon nitride (SiN), silicon oxide (SiO), and/or the like. A film thickness d3 of the insulating layer 212a is designed to be thinner than the film thickness d4 of the insulating layer 212 illustrated in FIG. 4A (d3<d4). As illustrated in FIG. 4B, in the bend portion 112, if the insulating film 220 itself is removed, this results in a shift of the location of the neutral plane NP in the downward direction, so that the insulating layer 212a is located closer to the neutral plane NP, and therefore a reduction in a crack occurring in the insulating layer 212a is achieved. Further, with consideration given to a defect ratio in the insulating layer 212a, it is hard to produce a crack in the insulating layer 212a, thereby preventing a break in the wiring 230. The remaining configuration is the same as that in FIG. 4B, and therefore is not described.

In the third modification illustrated in FIG. 7B, FIG. 7B differs from FIG. 4B in that an insulating layer (fourth inorganic insulating layer) 240a with thin film thickness is placed on the resin substrate 201 or between the resin substrate 201 and the first organic insulating layer 210a. That is, the insulating layer 240a is placed between the fourth multilayer layer (210a, 230, 210b) and the resin substrate 201. The insulating layer 240a is composed of an inorganic insulating film of silicon nitride (SiN), silicon oxide (SiO) and/or the like. A film thickness d5 of the insulating layer 240a is designed to be thinner than the film thickness d6 of the insulating layer 240 illustrated in FIG. 4A (d5<d6). Because the insulating layer 240a is placed between the resin substrate 201 and the first organic insulating layer 210a, if the resin substrate 201 exhibits high moisture permeability, watertightness in the bend portion 112 can be enhanced. The remaining configuration is the same as that in FIG. 4B, and therefore is not described.

The fourth modification illustrated in FIG. 7C is a combination of FIG. 7A and FIG. 7B. That is, the insulating layer 212a with thin film thickness and the insulating layer 240a with thin film thickness are placed in the bend portion 112. The insulating layer 212a is placed on the second organic insulating layer 210b or between the second organic insulating layer 210b and the seal material 106a. The insulating layer 240a is placed on the resin substrate 201 or between the resin substrate 201 and the first organic insulating layer 210a. The remaining configuration is the same as that in FIG. 4B, and therefore is not described.

It is noted that, although not shown, a combined configuration of the configuration in FIG. 4C and the second modification to the fourth modification (FIG. 7A to FIG. 7C) is possible. Specifically, in FIG. 7A to FIG. 7C, the insulating film 220a with thin film thickness may be placed on the light shielding member 217. Also, in the end portions of the array substrate 101 and the counter substrate 108 beyond the bend portion 112, the insulating layer 240 and the insulating film 220 may be fo lied similarly to in the display portion 102. Because of the insulating layer 240 and the insulating film 220, the effect of preventing moisture from entering from end portions can be expected.

It is noted that each of the resin substrate 201 and the resin substrate 219 may be replaced by a glass substrate.

All display devices which can be implemented by those skilled in the art making appropriate design changes to the display devices described above as the embodiments according to the present invention fall within the scope of the present invention insofar as the subject matter of the present invention is embodied.

Within the spirit of the present invention, various alterations, modifications, and variations can be conceived by those skilled in the art, and it will be appreciated that all such alterations, modifications, and variations fall within the scope of the present invention. For example, those skilled in the art may appropriately make additions, omissions or design changes of components or make additions, omissions or condition changes of process steps to/from each of the above-described embodiments, all the results of which fall within the scope of the present invention insofar as the subject matter of the present invention is embodied.

It should be understood that other operational advantages provided by the aspects set forth in the above embodiments, which are apparent from the description of the specification or can be appropriately conceived by those skilled in the art, are provided reasonably by the present invention.

Numerous aspects of the present invention may be made by appropriate combinations of multiple components disclosed in the above embodiments. For example, several components may be omitted from all the components illustrated in the embodiments. Further, the components used in different embodiments may be approximately combined.

What is claimed is:

1. A display device, comprising:
a first substrate;
a second substrate; and
a liquid crystal layer placed between the first substrate and the second substrate,
wherein the first substrate and the second substrate have a display area and a frame area around the display area,
the frame area has a seal material placed between the first substrate and the second substrate, and
the second substrate has
a second resin substrate,
in the display area, a first multilayer layer placed on a side of the second resin substrate facing the liquid crystal layer, the first multilayer layer including a first inorganic insulating film, a light shielding member, and an overcoat film, and
in the frame area, a second multilayer layer placed on the side of the second resin substrate facing the liquid crystal layer, the second multilayer layer including the light shielding member and the overcoat film.

2. The display device according to claim 1,
wherein the second substrate further includes, in the frame area, a second inorganic insulting film placed between the second resin substrate and the second multilayer layer, and the second inorganic insulating film has a film thickness thinner than a film thickness of the first inorganic insulating film.

3. The display device according to claim 2,
wherein the first inorganic insulating film and the second inorganic insulating film are formed simultaneously, and
the second inorganic insulating film has a thinner film thickness.

4. The display device according to claim 1,
wherein the first substrate has
a first resin substrate,
in the display area, a third multilayer layer placed on the first resin substrate, the third multilayer layer including a first inorganic insulating layer, a first organic insulating layer, wiring on the first organic insulating layer, and a second organic insulating layer placed on the wiring, and
in the frame area, a fourth multilayer layer placed on the first resin substrate, the fourth multilayer layer including the first organic insulating layer, the wiring on the first organic insulating layer, and the second organic insulating layer placed on the wiring.

5. The display device according to claim 4, wherein
the first substrate includes, in the frame area, a third inorganic insulting layer placed between the seal material and the fourth multilayer layer, and
the third inorganic insulating layer has a film thickness thinner than a film thickness of the first inorganic insulating layer.

6. The display device according to claim 4, wherein
the first substrate includes, in the frame area, a fourth inorganic insulting layer placed between the fourth multilayer layer and the first resin substrate, and
the fourth inorganic insulating layer has a film thickness thinner than a film thickness of the first inorganic insulating layer.

7. The display device according to claim 6, wherein
the first substrate further includes, in the frame area, a third inorganic insulting layer placed between the seal material and the fourth multilayer layer, and
the third inorganic insulating layer has a film thickness thinner than a film thickness of the first inorganic insulating layer.

8. The display device according to claim 4, wherein
the first resin substrate and the second resin substrate have flexibility.

9. The display device according to claim 4, further comprising, in the display area, on the third multilayer layer:
a first transparent electrode;
a second inorganic insulating layer placed on the first transparent electrode; and
a second transparent electrode.

* * * * *